United States Patent
Park

(10) Patent No.: US 8,160,105 B2
(45) Date of Patent: Apr. 17, 2012

(54) APPARATUS AND METHOD FOR PROCESSING IP PACKET FRAGMENTATION IN ROUTING SYSTEM USING NETWORK PROCESSOR

(75) Inventor: Woo-Jin Park, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 12/557,182

(22) Filed: Sep. 10, 2009

(65) Prior Publication Data
US 2010/0067540 A1 Mar. 18, 2010

(30) Foreign Application Priority Data
Sep. 17, 2008 (KR) .................. 10-2008-0091094

(51) Int. Cl.
*H04L 12/56* (2006.01)
(52) U.S. Cl. ........................................ 370/474; 370/476
(58) Field of Classification Search .................. None
See application file for complete search history.

(56) References Cited

U.S. PATENT DOCUMENTS

| 7,035,212 | B1* | 4/2006 | Mittal et al. | 370/230 |
| 2001/0036185 | A1* | 11/2001 | Dempo | 370/392 |
| 2004/0105438 | A1* | 6/2004 | Moon et al. | 370/389 |
| 2006/0106946 | A1* | 5/2006 | Agarwal et al. | 709/250 |
| 2008/0298258 | A1* | 12/2008 | Susilo et al. | 370/248 |
| 2009/0265530 | A1* | 10/2009 | Guo et al. | 712/227 |
| 2009/0310485 | A1* | 12/2009 | Averi et al. | 370/232 |
| 2010/0265967 | A1* | 10/2010 | Lim et al. | 370/474 |

* cited by examiner

*Primary Examiner* — Hassan Phillips
*Assistant Examiner* — Duc Duong
(74) *Attorney, Agent, or Firm* — The Farrell Law Firm, P.C.

(57) ABSTRACT

An apparatus and method for processing IP packet fragmentation in a routing system using a network processor includes an ingress network processor receiving a packet, and if the received packet is greater than MTU, fragmenting the packet rather than sending the packet to a control processor to fragment the packet. All packets are processed using a fragmentation-based packet-processing method as a result of packet encapsulation, which is caused for mobility support in an IPv4 router. In addition, all the packets are processed by micro-engines, a data plane processor, irrespective of whether fragmentation is to be performed. Accordingly, the same packet-processing rate can be supported to mobile nodes irrespective of mobility or packet size.

22 Claims, 8 Drawing Sheets

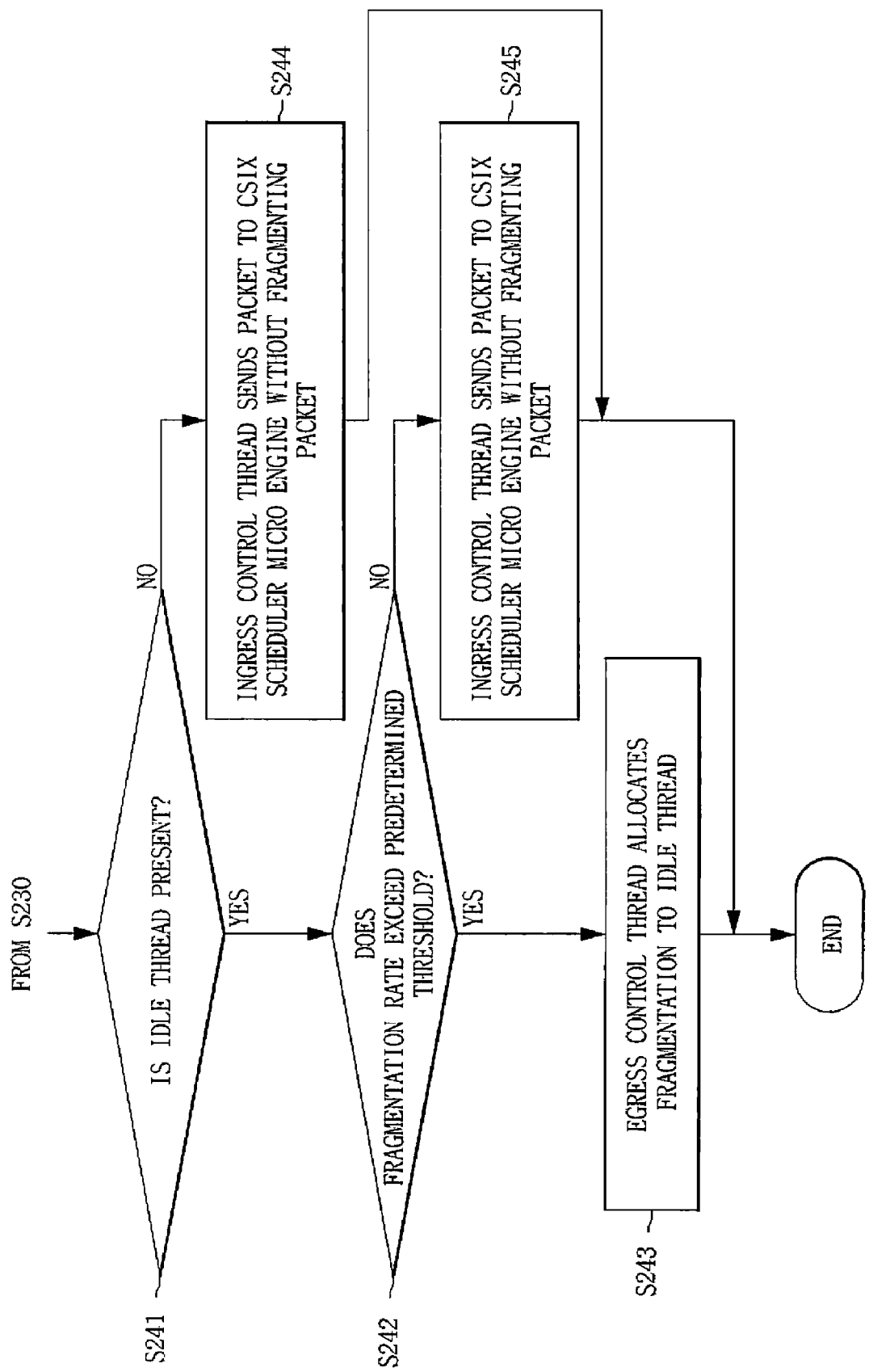

APPARATUS AND METHOD FOR PROCESSING IP PACKET FRAGMENTATION IN ROUTING SYSTEM USING NETWORK PROCESSOR

PRIORITY

This application claims priority under 35 U.S.C §119(a) to an application entitled "APPARATUS AND METHOD FOR PROCESSING IP PACKET FRAGMENTATION IN ROUTING SYSTEM USING NETWORK PROCESSOR" filed in the Korean Intellectual Property Office on Sep. 17, 2008 and assigned Serial No. 2008-0091094, the contents of which are incorporated herein by reference.

BACKGROUND OF THE INVENTION

1. Field of the Invention

The present invention relates to an apparatus and method for processing Internet Protocol (IP) packet fragmentation to support mobility in a router using a network processor, and more particularly, to an apparatus and method for processing IP packet fragmentation in a routing system using a network processor in order to improve the efficiency of the network processor and to accelerate packet-processing rate.

2. Description of the Related Art

The appearance of new types of Internet services such as voice/data integration and wired/wireless Internet integration has led to an increase in the amount of data to be transmitted and the types of services to support.

Due to such environmental changes, it is substantially impossible to add new functions to or improve performance in Application Specific Integrated Circuit (ASIC) based network devices. The ASIC was developed as part of the Internet, and the ASIC-based network devices are based on the silicon chip. Thus, ASIC-based network devices have limited capacity to process packets. In addition, the network devices developed up to the present use an ASIC switch chip.

In this case, only the functions provided by the ASIC switch chip can be used. In addition, it has been required to set register values provided by the ASIC switch chip in order to use the functions.

Accordingly, it has been impossible to modify existing functions or implement new functions.

To overcome this, a new type of network device has been introduced, based on a network processor known as a new generation silicon chip.

The network processor is a programmable processor capable of processing packets received via an input user interface (i.e., an input port) in various methods before sending the packets via an output user interface (i.e., an output port). The network processor is a specialized packet processor that can provide high-performance packet-processing capacity at the level of the ASIC while promptly responding to various user demands through a program.

The network processor is a non-memory device that can transmit traffic between ports and act as an intelligent switch based on its programming functions, thereby providing various types of multimedia Internet traffic services in a network device such as a router and a switch. Thus, the network processor can be regarded as a key product of a next generation network device.

In general, the network processor can be configured to include a plurality of micro-engines each including a plurality of threads.

Although a network processor including only one thread can of course be used, it is not generally used due to its inefficiency.

In the related art, an IP packet-processing device for providing mobility to a router uses mobile IP. The mobile IP is a technology required to constantly ensure connection to a terminal having an IP address while the terminal is moving.

Under the current Internet Protocol, a terminal cannot access the Internet when it moves to a different network since its position accessing the Internet is fixed and service is provided on the assumption that an IP fixed on a specific network will be used.

However, the mobile IP system solves the above-described problems and supports mobility based on a double-address system.

This type of mobile IP technology is a fundamental technology that should be realized for the future wireless Internet.

This means that all mobile terminals have to inevitably support mobile IP in consideration that future mobile communication networks will develop into all-IP networks.

This is because Internet protocols are sure to be used as common service protocol in final wire/wireless integrated networks, which are referred to as all-IP networks, and the mobile IP technology is a mobility supported protocol of the Internet protocols.

The mobile IP technology can be applied to a network system such as a router by using a network processor. Below, with reference to the accompanying drawings, a description will be made of one example of the network processor constructed in the network system.

FIG. 1 is a block diagram illustrating an IP packet-processing apparatus including a typical network processor.

The network processor includes sixteen (16) multi-thread packet-processing micro-engines 112 to 127, a core 129, a media switch fabric 100, Static Random Access Memory (SRAM) controllers 102 to 105, Dynamic Random Access Memory (DRAM) controllers 106 to 108, a scratch pad memory 101, and a Peripheral Component Interconnect (PCI) controller 110.

The network processor also includes two engine clusters 100-1 and 100-2, in which the engine cluster 100-1 includes eight (8) micro-engines 112 to 119, and cluster 100-2 includes eight (8) micro-engines 120 to 127.

Threads of the network processor are units of work, to each of which one packet can be allocated.

Each of the micro-engines 112 to 127 is a piece of hardware that performs a variety of network processing functions and processes data at OC-192 (Optical Carrier-192) wire speed.

The core 129 is a 32-bit Reduced Instruction Set Computer (RISC). The core 129 carries out high-performance processes, for example, by processing an exceptional packet, executing a complicated algorithm, maintaining a route table, etc. The SRAM controllers 102 to 105 and the DRAM controllers 106 to 108 perform management for efficient access to SRAMs and DRAMs, in which routing tables or various data structures are stored.

The media switch fabric 100 is connected to a framer, a Media Access Controller (MAC) device or to a switch fabric.

The PCI controller 110 manages communication with an external host processor, other chips, and so on, which are connected via PCT bus. Below, with reference to FIG. 2, a description will be given of a packet process system using the above-described network processor.

FIG. 2 is a block diagram illustrating a conventional network processor.

More specifically, FIG. 2 shows an illustrative application of the network processor on a network in which Internet Protocol version-4 (IPv4) packets and Internet Protocol version-6 (IPv6) packets coexist.

An ingress network processor processes a packet received via an input interface and then forwards the received packet to a Common Switch Interface (CSIX) switch fabric, and an egress network processor processes a packet forwarded from the CSIX switch fabric and then sends the packet to a corresponding output interface.

In this case, the packet-forwarding unit of the input/output interfaces and the network processors is an Ethernet frame, and the packet-forwarding unit of the network processors and the CSIX Switch Fabric is a CSIX frame.

Sixteen (16) micro-engines at the ingress side can be used as a packet receiver 200, a packet classifier or Ethernet decap 201, an IPv6 packet forwarder 202, an IPv4 packet forwarder 203, a CSIX cell scheduler 204, a CSIX queue manager 205, and a CSIX transmitter 206. As egress network processors, a CSIX receiver 210, an Ethernet Address Resolution Protocol (ARP) 211, a packet scheduler 212, a packet queue manager 213, and a packet transmitter 214 can be used.

In order to assist in the understanding of the network processor, respective reference numerals (i.e., 200 through 206 and 210 through 214) of the micro-engines, which are used to perform respective functions, are added to respective functional sections.

In addition, at least one or two micro-engines can be allocated to respective functions in order to process a packet at OC-192 wire speeds based on the respective functions. The remaining micro-engines of the ingress and egress network processors can also be allocated to perform additional functions.

An Ethernet frame, which is input via an input interface of the packet receiver 200, is reassembled.

The packet classifier 201 decapsulates input packets, and classifies types and service grades according to the Quality of Service (QoS) of the packets by referring to the header of the packets.

The packet classifier 201 determines whether a received packet is an IPv4 packet or an IPv6 packet, and based on a result of the determination, outputs the packet to the IPv6 packet forwarder 202 or the IPv4 packet forwarder 203.

In addition, if the received packet is an Address Resolution Protocol (ARP) packet, a control packet associated with a routing protocol, or a packet requiring fragmentation, the packet classifier 201 outputs the packet to the core 129.

The IPv6 packet forwarder 202 and the IPv4 packet forwarder 203 outputs a unicast packet to the packet queue (i.e., the SRAM controller 2) 104 by performing Longest Prefix Match (LPM) on the unicast packet. As a result of the LPM, the output interface of the packet is determined, and resultant information is forwarded on header information of the CSIX frame to the egress network processor. Based on the obtained information, the egress network processor can encapsulate the Ethernet header of the packet or transmit the packet to a corresponding output interface.

The packet classifier 201, the IPv6 packet forwarder 202, and the IPv4 packet forwarder 203 can be commonly referred to as a packet forwarder 207.

The CSIX cell scheduler 204 and the CSIX queue 205 output a packet, forwarded from the IPv6 packet forwarder 202 or the IPv4 packet forwarder 203, to the CSIX transmitter 206 by performing buffering and scheduling on the packet.

The CSIX transmitter 206 encapsulates the CSIX header of the input packet based on a result of LPM and sends the packet to the CSIX switch fabric 20.

The CSIX receiver 210 reassembles a CSIX frame input through the CSIX switch fabric.

The Ethernet ARP 211 adds an Ethernet frame of the CSIX frame header based on output interface information of the CSIX frame header.

The packet scheduler 212 and the packet queue 213 output a packet, forwarded from the Ethernet ARP 211, to the packet transmitter 214 by performing buffering and scheduling on the packet.

The packet transmitter 214 outputs the input packet to a corresponding output interface.

According to the prior art, all packets requiring fragmentation are sent to the core 129.

In the case of providing IP mobility to nodes using the network processor, unlike IP fragmentation for mobile IPv4, IP fragmentation for mobile IPv4 is performed by a router. However, the related art may have the following problems.

First, unlike IP fragmentation for mobile IPv6, IP fragmentation for mobile IPv4 has to be performed by the router in order to provide IP mobility.

In the development of a router, to which a mobile IPv4 function is added (i.e., a router, which is realized by adding a home agent function to mobile nodes), fragmentation requires that a home agent can transmit a packet to the mobile nodes through encapsulation if the mobile nodes are on a foreign network.

In this case, fragmentation occurs when the packet is greater than Maximum Transmission Unit (MTU), which exceeds 1500 bytes in the case of Ethernet.

According to existing research using the network processor under this situation, IP fragmentation has been performed on a control plane.

However, packets may be processed at different rates according to sizes even if the packets are of the same type.

Specifically, some packets, which do not require fragmentation, are processed on a data plane (e.g., the micro-engines 112 through 127 in FIG. 1) and the other packets, which require fragmentation, are processed on a control plane (e.g., the core 129 in FIG. 2).

Second, the amount of packets, which mobile nodes transmit over a network, may occasionally vary, and the size of the packets may occasionally vary as well.

In the router supporting IP mobility, the amount of packets, which do not require fragmentation, may occasionally vary.

Considering that the key function of the Core 129 is a control packet such as an ARP and a routing protocol, a bottle neck effect may occur in the core in proportion to the amount of packets requiring fragmentation.

Accordingly, the network processor is not efficiently used in the related art.

SUMMARY OF THE INVENTION

The present invention has been made to solve at least the foregoing problems with the prior art, and an aspect of the present invention is to provide an apparatus and method for processing IP packet fragments in a routing system using a network processor, in which each of ingress and egress network processors dynamically allocates the function of eight (8) threads of one micro-engine according to the amount of a packet requiring fragmentation when packets are received at the network processor from mobile nodes of a network, thereby efficiently using resources in the network processor.

Another aspect of the present invention is to provide a router functioning as a home agent of a mobile IPv4 system using a network processor, and more particularly, to an apparatus and method for processing IP packet fragments in a routing system using a network processor, which can increase the packet-processing rate by interfacing IP fragmentation at a data plane and dynamically allocate threads of the network processor according to the amount of a packet to be fragmented, thereby efficiently using resources in the network processor.

According to an aspect of the present invention, the apparatus for processing IP packet fragments in a routing system using a network processor may include an ingress network processor receiving a packet, and if the received packet is greater than the Maximum Transmission Unit (MTU), fragmenting the packet rather than sending the packet to a control processor to fragment the packet.

According to an aspect of the present invention, the method for processing IP packet fragmentation in a routing system using a network processor may include determining, at a forwarder micro-engine of an ingress network processor, whether a received packet has a size greater than MTU; if the size of the packet is greater than the MTU, sending, at the forwarder micro-engine of the ingress network processor, the packet to an ingress fragmentation micro-engine of an ingress network processor; and fragmenting, at the ingress fragmentation micro-engine of the ingress network processor, the packet greater than the MTU.

According to the apparatus and method for processing IP packet fragmentation in a routing system using a network processor in accordance with embodiments of the invention, all packets are processed using a fragmentation-based packet-processing method as a result of packet encapsulation, which is caused for mobility support in an IPv4 router. In addition, all the packets processed by micro-engines, a data plane processor, irrespective of whether fragmentation is to be performed. Accordingly, the same packet-processing rate can be supported to mobile nodes irrespective of mobility or packet size.

Since fragmentation is processed by the micro-engines, it is possible to reduce overhead in a control processor, which is a resource of the network processor, mainly designed to process a control packet such as an ARP and a routing protocol.

BRIEF DESCRIPTION OF THE DRAWINGS

The above and other aspects, features and advantages of the present invention will be more apparent from the following detailed description when taken in conjunction with the accompanying drawings, in which:

FIG. 8 is a flowchart illustrating a thread allocating process for fragmentation at an egress network processor in the method for processing IP packet fragmentation in a routing system using a network processor shown in FIG. 5.

DETAILED DESCRIPTION OF THE EXEMPLARY EMBODIMENTS

The present invention will now be described more fully hereinafter with reference to the accompanying drawings, in which exemplary embodiments of an apparatus and method for processing fragmentation on an IP packet in a routing system using a network processor of the present invention are shown. It will be understood by those having an ordinary skill in the art that the system described below is merely exemplified for describing the invention with no limit to the scope of the present invention.

Figure 1:
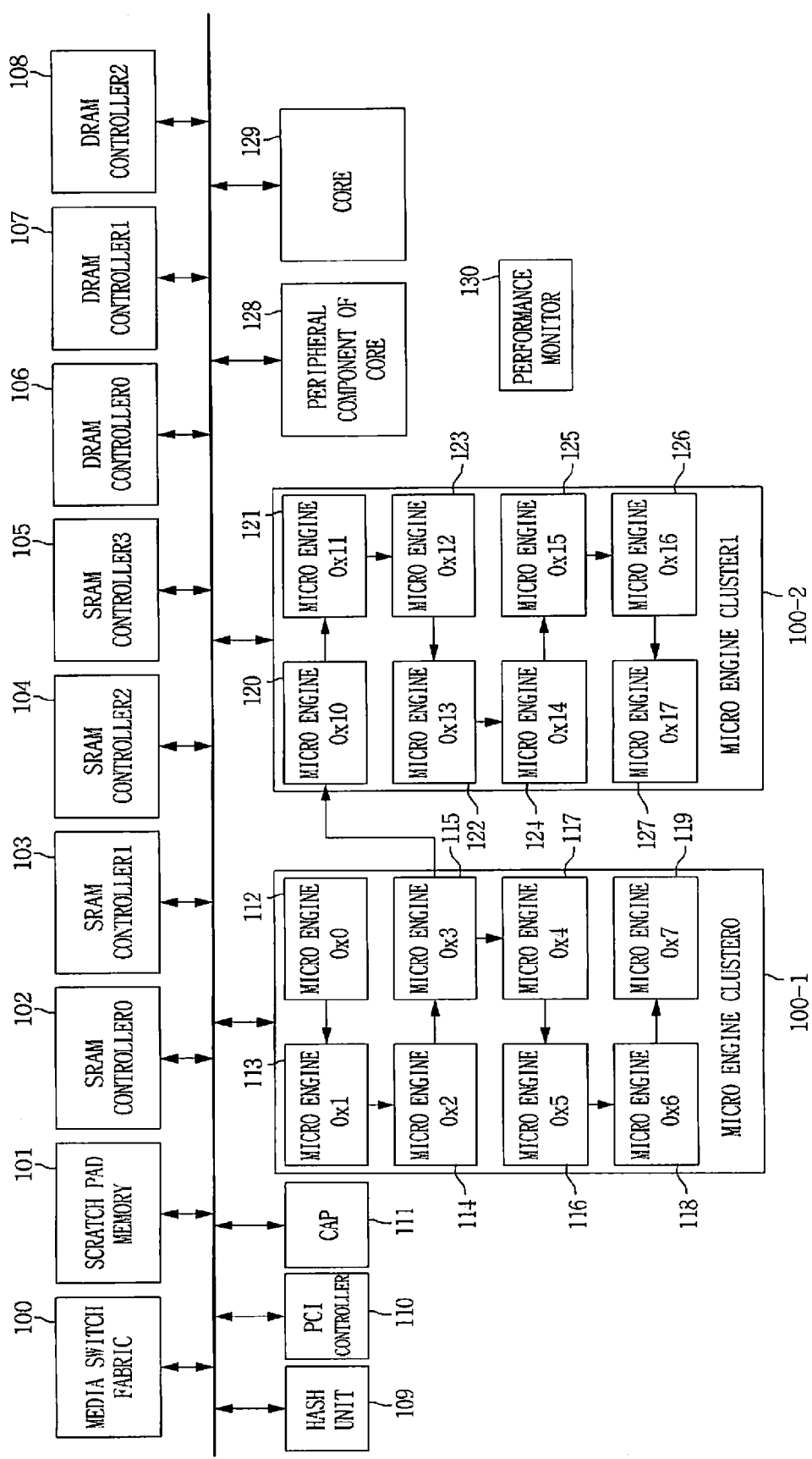
FIG. 1 is a block diagram illustrating a routing system including a network processor.
Figure 2:
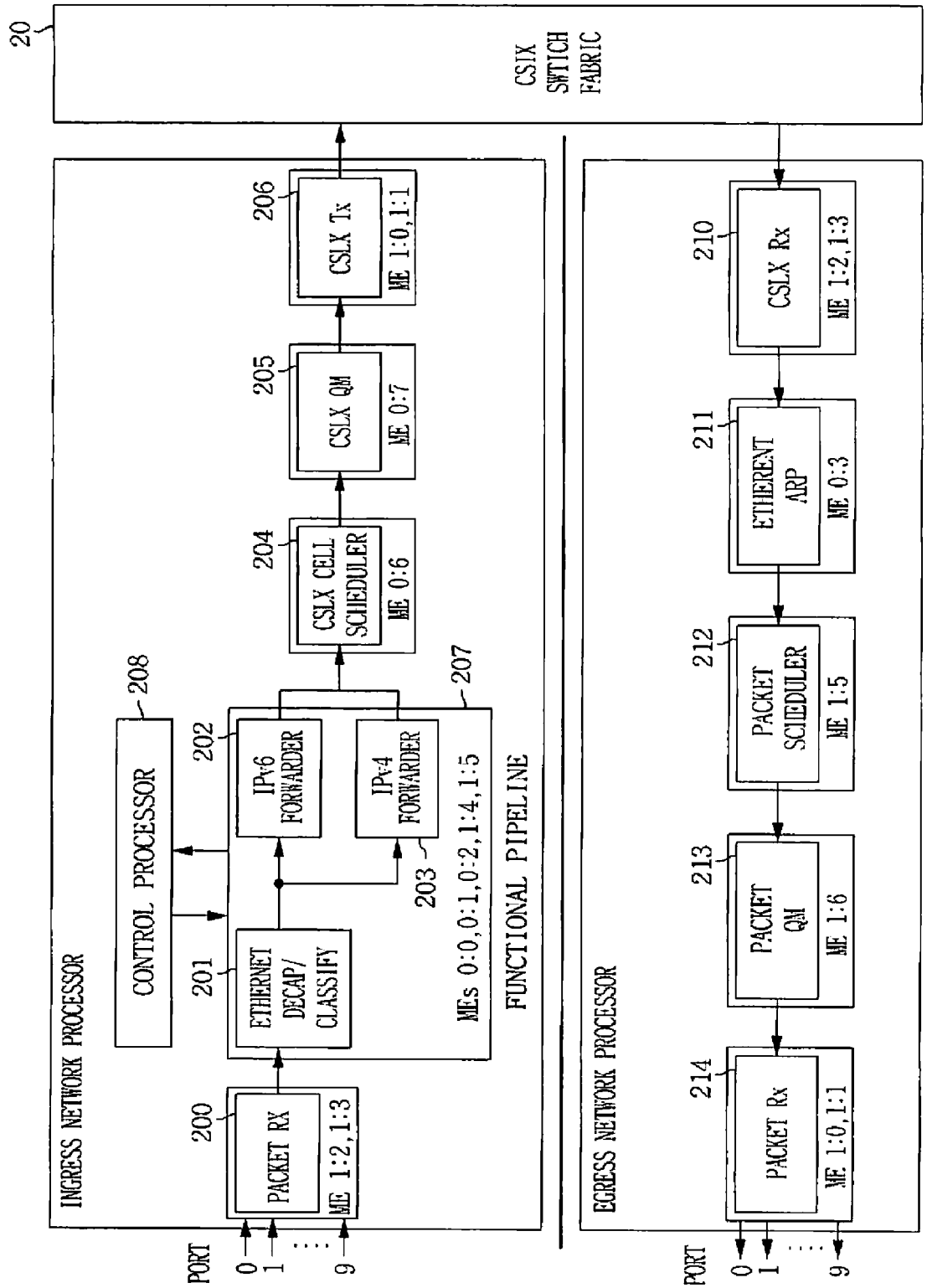
FIG. 2 is a block diagram illustrating the configuration of an apparatus for processing fragmentation on an IP packet in the routing system including a network processor shown in FIG. 1.
Figure 3:
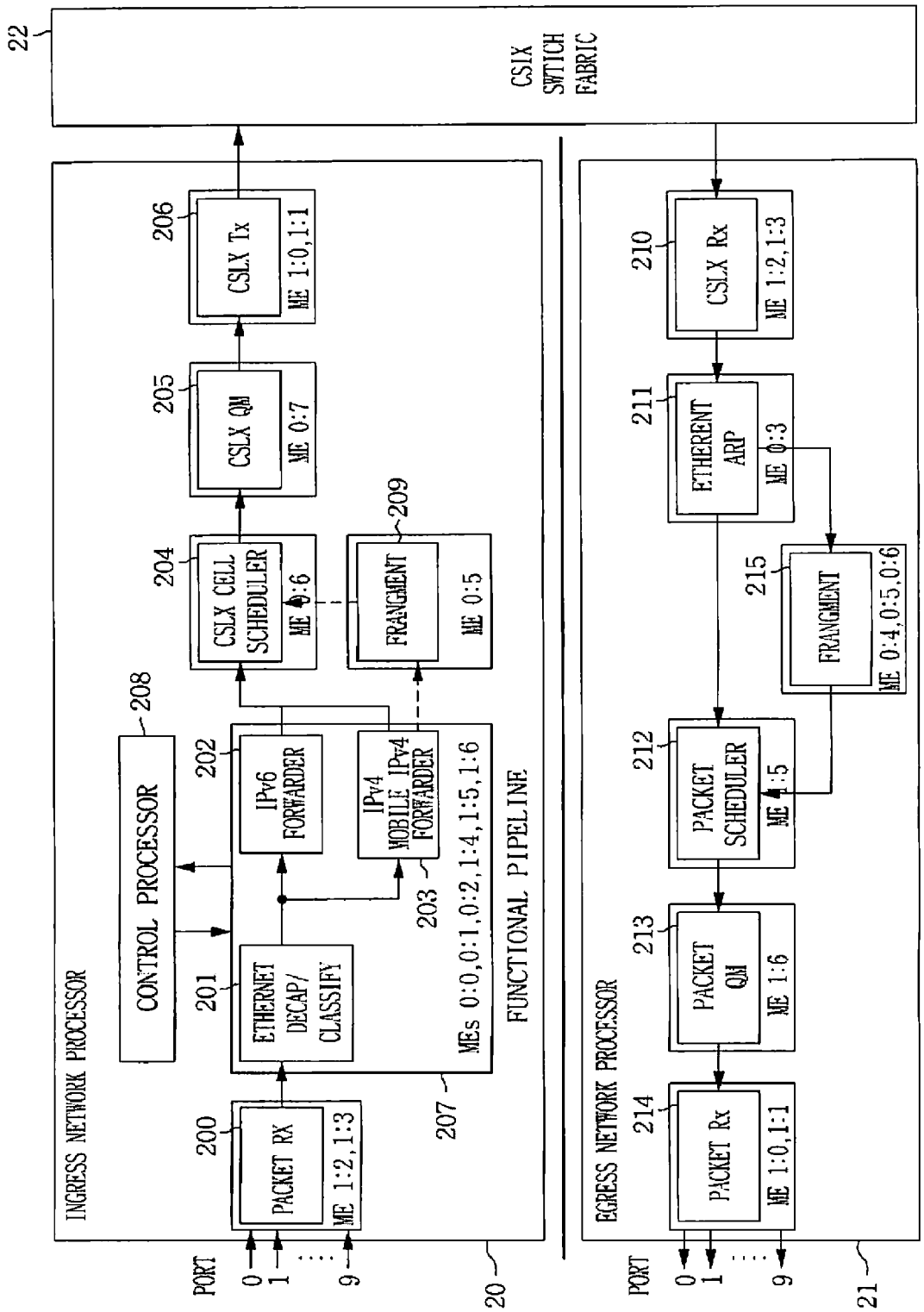
FIG. 3 is a block diagram illustrating the configuration of an apparatus for processing fragmentation on an IP packet in a routing system using a network processor in accordance with an embodiment of the present invention.

FIG. 3 is a block diagram illustrating the configuration of an apparatus for processing fragmentation on an IP packet in a routing system using a network processor in accordance with an embodiment of the present invention. The apparatus for processing fragmentation on an IP packet in a routing system of the present invention includes an ingress network processor 20, a CSIX switch fabric 22, and an egress network processor 21.

The ingress network processor 20 receives an MTU size packet, and if the received packet is greater than the MTU, fragments the packet without transmitting the packet to the control processor 208. The ingress network processor 20 includes an IPv4 packet forwarder micro-engine 203, an ingress fragmentation micro-engine 209, and a CSIX transmission micro-engine 206. The ingress fragmentation micro-engine 209 includes an ingress control thread and at least one ingress fragmentation thread.

When a packet greater than the MTU is received from the ingress network processor 20, the egress network processor 21 fragments the packet without transmitting the packet to the control processor 208. The egress network processor 21 includes a CSIX receive micro-engine 210, an egress fragmentation micro-engine 215, and an Ethernet ARP micro-engine 211. The egress fragmentation micro-engine 215 includes an egress thread and at least one egress fragmentation thread.

The ingress network processor 20 or the egress network processor 21 includes at least one micro-engine, which is constructed with eight (8) threads to operate and is realized using assembly language.

The packet forwarder micro-engine 203 of the ingress network processor 20 determines whether the received packet is greater than the MTU. If the packet size is not greater than the MTU, the packet forwarder micro-engine 203 sends the packet to a CSIX cell scheduler micro-engine 204. Otherwise, the packet forwarder micro-engine 203 sends the packet to the ingress fragmentation micro-engine 209.

In addition, if the packet received via the packet forwarder micro-engine 203 is greater than the MTU, the ingress fragmentation micro-engine 209 of the ingress network processor 20 fragments the packet and then sends the packet to the CSIX cell scheduler micro-engine 204.

Figure 4A:
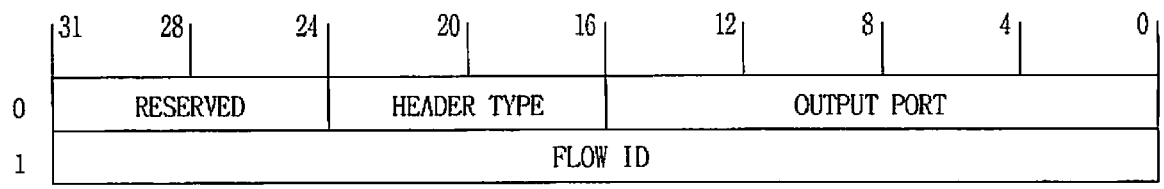
FIGS. 4A and 4B illustrate a CSIX packet header in the apparatus for processing fragmentation on an IP packet using a network processor shown in FIG. 3.
Figure 4B:
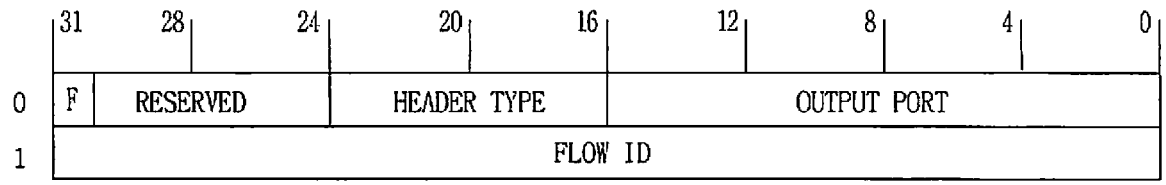

If fragmentation on the packet greater than the MTU is not performed by the ingress fragmentation micro-engine 209, the CSIX transmission micro-engine 206 of the ingress network processor 20 sends the packet to the egress network processor 21 by adding a flag to the header of the packet as shown in FIG. 4B. The flag indicates whether the packet size is greater than the MTU. If the packet size is not greater than the MTU, as shown in FIG. 4A, the CSIX transmission micro-engine 206 sends the packet to the egress network processor 21 without setting the flag.

The CSIX receive micro-engine 210 of the egress network processor 21 determines whether the packet received via the CSIX switch fabric 22 from the ingress network processor 20 is greater than the MTU by checking the header of the packet.

If the packet received via the Ethernet ARP micro-engine 211 is greater than the MTU, the egress fragmentation micro-engine 215 of the egress network processor 21 fragments the packet before sending the packet to the packet scheduler micro-engine 212.

If the packet received via the CSIX receive micro-engine 210 is not greater than the MTU, the Ethernet ARP micro-engine 211 of the egress network processor 21 sends the packet to the packet scheduler 212. Otherwise, the Ethernet ARP micro-engine 211 sends the packet to the egress fragmentation micro-engine 215.

When a packet greater than the MTU is received, the ingress control thread of the ingress fragmentation micro-engine 209 determines whether an idle thread is present. If the idle thread is present, the ingress control thread determines whether a fragmentation rate of the thread, which has been running, exceeds a predetermined threshold. If the fragmentation rate of the thread, which has been running, does not exceed the predetermined threshold, the ingress control thread allocates the fragmentation of the packet greater than the MTU to the idle thread. If the idle thread is not present, the ingress control thread sends the packet greater than the MTU to the CSIX scheduler micro-engine 204 without fragmenting the packet. In addition, if the fragmentation rate of the thread, which has been running, exceeds the predetermined threshold, the ingress control thread sends the packet greater than the MTU to the CSIX scheduler micro-engine 204 without fragmenting the packet.

In addition, when the fragmentation is allocated by the ingress control thread, the at least one egress fragmentation thread of the ingress fragmentation micro-engine 209 fragments the received packet and then sends the packet to the CSIX scheduler micro-engine 204. At the same time, the egress fragmentation thread provides fragmentation rate information to the ingress control thread.

When the packet is received, the egress control thread of the egress fragmentation micro-engine 215 determines whether an idle thread is present. If the idle thread is present, the egress control thread determines whether the fragmentation rate of the thread, which has been running, exceeds a predetermined threshold. If the fragmentation rate of the thread, which has been running, does not exceed the predetermined threshold, the egress control thread allocates the fragmentation of the packet greater than the MTU to the idle thread. If the idle thread is not present, the egress control thread sends the packet greater than the MTU to the packet scheduler micro-engine 212 without fragmenting the packet. If the fragmentation rate of the thread, which has been running, exceeds the predetermined threshold, the egress control thread sends the packet greater than the MTU to the packet scheduler micro-engine 212 without fragmenting the packet.

In addition, when the fragmentation is allocated by the egress control thread, at least one egress fragmentation thread of the egress fragmentation micro-engine 215 fragments the received packet and then sends the packet to the packet scheduler micro-engine 212. At the same time, the egress fragmentation thread provides fragmentation rate information to the egress control thread.

First, a packet with a size less than the MTU is received via a port. The packet received via a packet receive micro-engine towards the ingress network processor 20 is input via a packet classifier (or Ethernet decap) into an IPv6 forwarder micro-engine 202 or the IPv4 forwarder micro-engine 203. An IPv6 packet is sent to the IPv6 forwarder micro-engine 202, and an IPv4 packet is sent to the IPv4 forwarder micro-engine 203. Below, a description will be made of the IPv4 packet.

The IPv4 forwarder micro-engine 203 determines whether the received packet is greater than the MTU.

If the received packet size is equal to the MTU and a destination terminal remains stationary without moving to another location, the packet is not subjected to conversion into mobile IP. Thus, the size of a packet to be sent to a destination is set to be the same as the MTU.

Then, the packet forwarder micro-engine 203 of the ingress network processor 20 processes the received packet by sending the packet to the CSIX cell scheduler micro-engine 204. Accordingly, the packet is not subjected to fragmentation.

In contrast, the received packet size is equal to the MTU and the destination terminal moves to another location, a corresponding router performs mobile IP conversion.

Thus, the packet size becomes greater than the MTU since the packet forwarder micro-engine 203 of the ingress network processor 20 performs mobile IP conversion.

Then, the packet forwarder micro-engine 203 of the ingress network processor 20 sends the packet to the ingress fragmentation micro-engine 209.

When the packet greater than the MTU is received from the packet forwarder micro-engine 203, the ingress fragmentation micro-engine 209 of the ingress network processor 20 fragments the packet and then sends the packet to the CSIX cell scheduler micro-engine 204.

In this case, the ingress network processor 20 includes at least one micro-engine, which is constructed with eight (8) threads to operate and is realized using assembly language.

Accordingly, the first thread is set as the ingress control thread of the ingress fragmentation micro-engine 209. However, this is not intended to limit the present invention.

If the packet size is greater than the MTU, the ingress control thread of the ingress fragmentation micro-engine 209 determines whether an idle thread is present.

If the idle thread is present, the ingress control thread of the ingress fragmentation micro-engine 209 determines whether a fragmentation rate of the thread, which has been running, exceeds a predetermined threshold.

Afterwards, if the fragmentation rate does not exceed the predetermined threshold, the ingress control thread of the ingress fragmentation micro-engine 209 allocates the fragmentation of the packet greater than the MTU to the idle thread.

The egress fragmentation thread of the ingress fragmentation micro-engine 209, to which fragmentation is allocated, fragments the packet greater than the MTU and then sends the packet to the CSIX cell scheduler micro-engine 204. In addition, when the fragmentation is allocated, the egress fragmentation thread of the ingress fragmentation micro-engine 209 fragments a received packet and then sends the packet to the CSIX scheduler micro-engine 204. At the same time, the egress fragmentation thread provides fragmentation rate information to the ingress control thread.

Afterwards, the CSIX cell scheduler micro-engine 204 sends the fragmented packet to a CSIX QM micro-engine and the CSIX transmission micro-engine 206.

Then, the CSIX transmission micro-engine 206 of the ingress network processor 20 sends the packets to the egress network processor 21 via the CSIX switch fabric 22 without changing the flag of the packets.

If the idle thread is not present, the ingress control thread sends the packet greater than the MTU to the CSIX scheduler micro-engine 204 without fragmenting the packet. This indicates a shortage in threads for fragmentation, and thus fragmentation is not performed.

In addition, if the fragmentation rate of the thread, which has been running, exceeds the predetermined threshold, the ingress control thread sends the packet greater than the MTU to the CSIX scheduler micro-engine 204 without fragmenting the packet.

Afterwards, when a packet greater than the MTU is received via the CSIX scheduler micro-engine 204, the CSIX transmission micro-engine 206 sends the packet to the egress network processor 21 by adding a flag to the header of the packet as shown in FIG. 4B. The flag indicates whether the packet size is greater than the MTU. When a packet, which is not greater than the MTU, is received, as shown in FIG. 4A, the CSIX transmission micro-engine 206 sends the packet to the egress network processor 21 without setting a flag.

Then, the CSIX receive micro-engine 210 of the egress network processor 21 determines whether the packet, received from the ingress network processor 20 via the CSIX switch fabric 22, is greater than the MTU by checking the header of the packet.

If the received packet is greater than the MTU, the egress fragmentation micro-engine 215 of the egress network processor 21 processes the received packet by fragmenting the packet and then sending the packet to the packet scheduler micro-engine 212.

When the packet is received, the egress control thread of the egress fragmentation micro-engine 215 determined whether an idle thread is present.

If the idle thread is present, the egress control thread of the egress fragmentation micro-engine 215 determines whether a fragmentation rate of the thread, which has been running, exceeds the predetermined threshold.

If the fragmentation rate of the thread, which has been running, does not exceed the predetermined threshold in the presence of the idle thread, the egress control thread of the egress fragmentation micro-engine 215 allocates fragmentation of the packet greater than the MTU to the idle thread.

When the fragmentation is allocated by the egress control thread, the at least one egress fragmentation thread of the ingress fragmentation micro-engine 209 fragments the received packet and then sends the packet to the CSIX scheduler micro-engine 204. At the same time, the egress fragmentation thread provides fragmentation rate information to the egress control thread.

If the idle thread is not present, the egress control thread sends the received packet greater than the MTU to the packet scheduler micro-engine 212 without fragmenting the packet.

In addition, if the fragmentation rate of the thread, which has been running, exceeds the predetermined threshold, the egress control thread sends the received packet greater than the MTU to the packet scheduler micro-engine 212 without fragmenting the packet.

If the packet received via the CSIX receive micro-engine 210 is not greater than the MTU, the Ethernet ARP micro-engine 211 of the egress network processor 21 processes the received packet by sending the packet to the packet scheduler 212.

Figure 5:
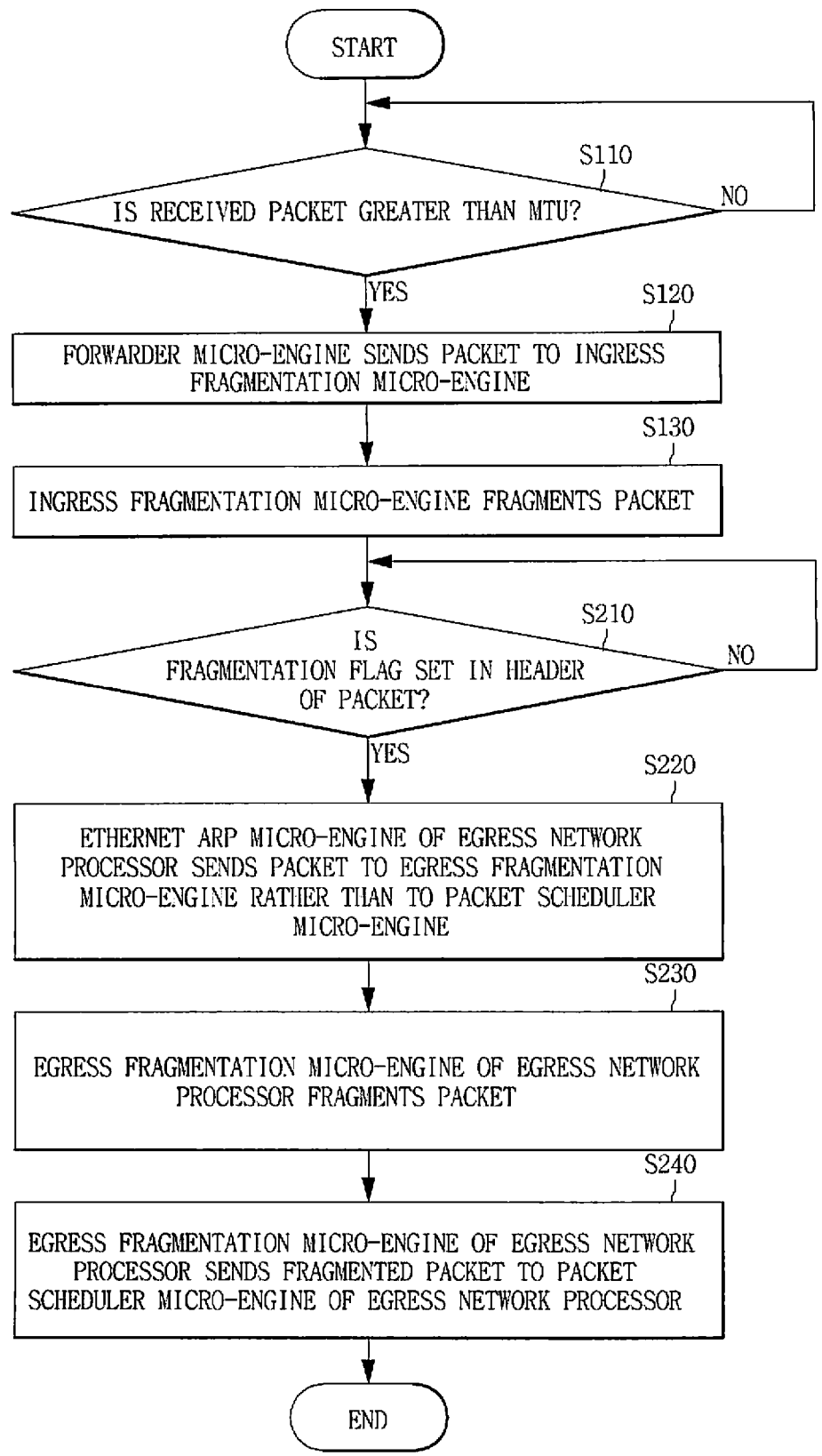
FIG. 5 is a flowchart illustrating a method for processing IP packet fragmentation in a routing system using a network processor in accordance with another exemplary embodiment of the present invention.

Below, with reference to FIG. 5, a description will be given of a method for processing IP packet fragmentation in a routing system using a network processor in accordance with another embodiment of the present invention.

First, in step S110, the forwarder micro-engine 203 of the ingress network processor 20 determines whether the size of a received packet is greater than MTU.

In the packet size determination step SI lo, if the packet is greater than the MTU due to mobile IP system supported, the forwarder micro-engine 203 of the ingress network processor 20 sends the packet greater than the MTU to the ingress fragmentation micro-engine 209 of the ingress network processor 20 in step S120.

In step S130, the ingress fragmentation micro-engine 209 of the ingress network processor 20 fragments the packet greater than the MTU and then sends the fragmented packet to the egress network processor 20.

Figure 6:
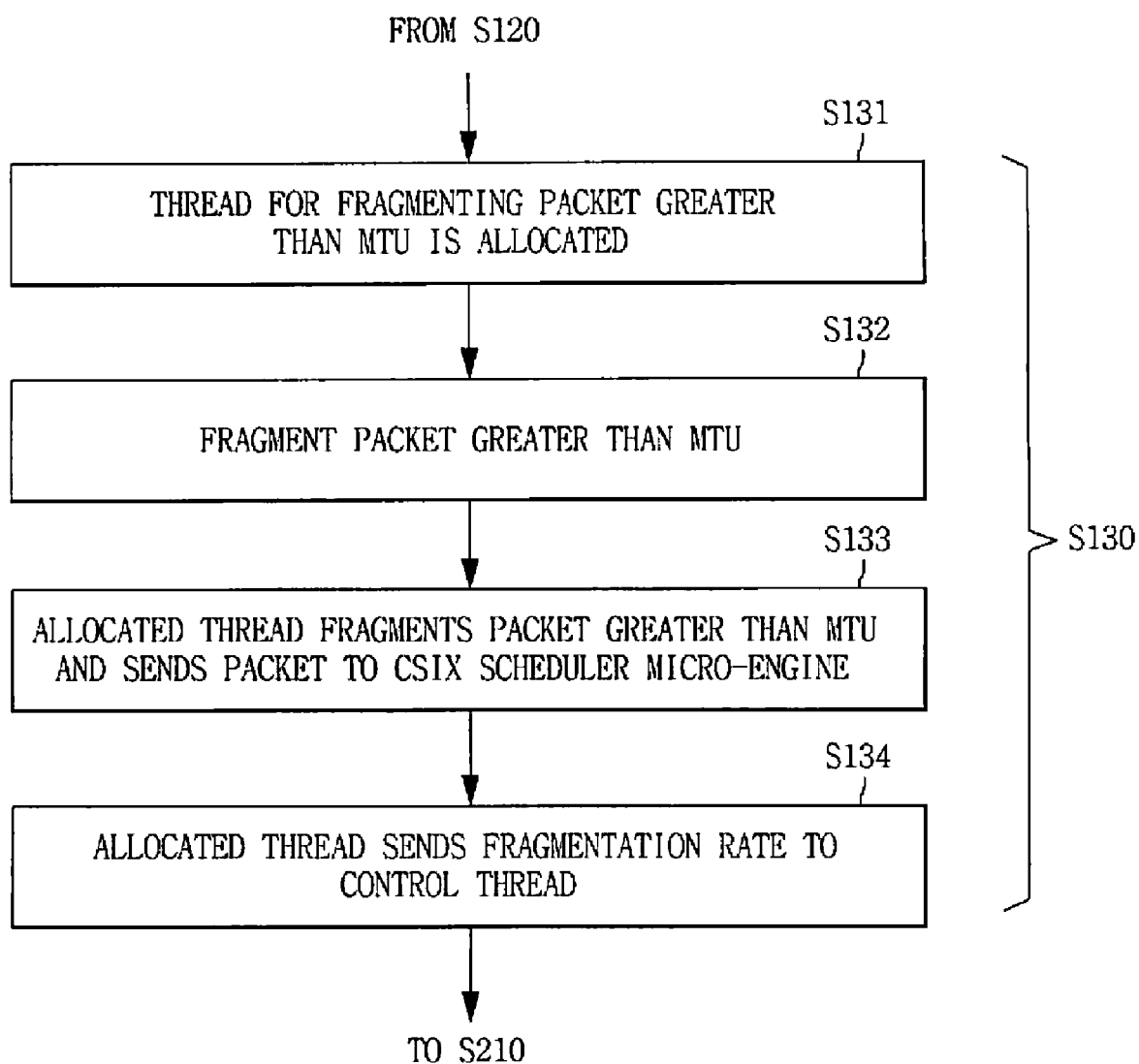
FIG. 6 is a flowchart illustrating a fragmentation process using a thread in the method for processing IP packet fragmentation in a routing system using a network processor shown in FIG. 5.

Below, an operating process of a fragmenting thread in the packet fragmentation step S130 the will be described with reference to FIG. 6.

First, in step S131, a thread for fragmenting the packet greater than the MTU is allocated.

In step S132, the allocated thread fragments the packet greater than the MTU.

After the packet greater than the MTU is fragmented, the allocated thread sends the packet to the CSIX scheduler micro-engine in step S133.

Next, in step S134, the allocated thread sends fragmentation rate of the packet to the control thread.

Figure 7:
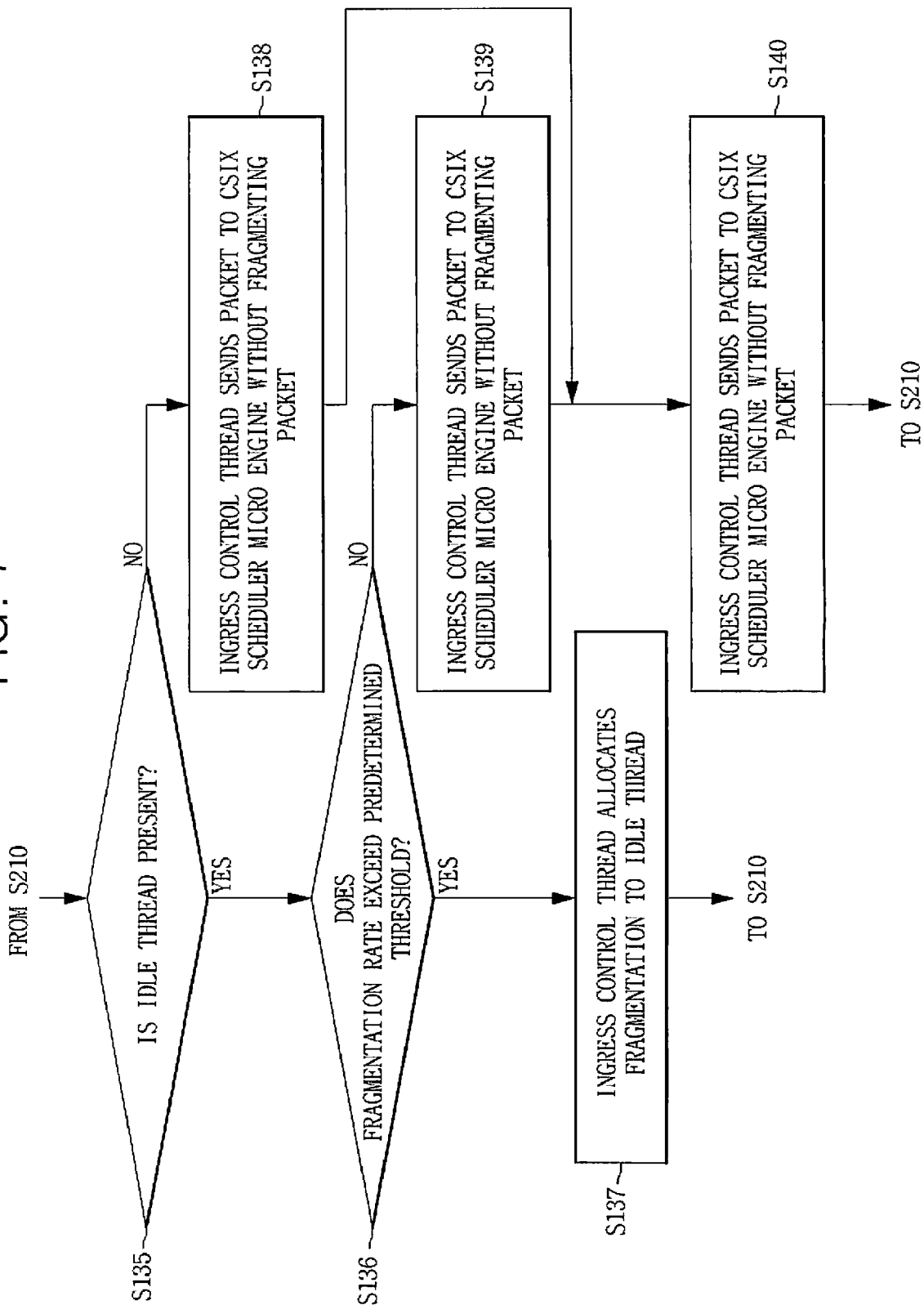
FIG. 7 is a flowchart illustrating a thread allocation process for fragmentation at an ingress network processor in the method for processing IP packet fragmentation in a routing system using a network processor shown in FIG. 5.

Below, an operating process of a control thread in the packet fragmentation step S130 will be described with reference to FIG. 7.

First, in step S135, the ingress control thread of the ingress fragmentation micro-engine 209 determines whether an idle thread is present.

If the idle thread is present as a result of the determination step S135, the ingress thread of the ingress fragmentation micro-engine 209 determines whether the fragmentation rate of the threads, which have been running, exceeds a predetermined threshold in step S136.

If the fragmentation rate of threads, which have been running, does not exceed the predetermined threshold as a result of the fragment rate determination in step S136, the ingress thread of the ingress fragmentation micro-engine 209 allocates fragmentation to the idle thread in step S137.

In contrast, if the idle thread is not present as a result of the idle thread determination step S135, the ingress thread of the ingress fragmentation micro-engine 209 sends the received packet greater than the MTU to the CSIX scheduler micro-engine without fragmenting the packet in step S138.

If the fragmentation rate of threads, which have been running, does not exceed the predetermined threshold as a result of the fragment rate determination in step S136, the ingress thread of the ingress fragmentation micro-engine 209 sends the packet greater than the MTU to the CSIX scheduler micro-engine without fragmenting the packet in step S139.

If the ingress thread of the ingress fragmentation micro-engine 209 sends the packet greater than the MTU to the CSIX scheduler micro-engine without fragmenting the packet, the CSIX transmission micro-engine 206 of the ingress processor sends the packet to the egress network processor via the CSIX switch fabric 22 by setting a fragmentation flag in the header of the packet greater than the MTU in step S140.

Returning to FIG. 5, in step S210, the CSIX receive micro-engine 210 of the egress network processor 21 determines whether the fragmentation flag is set in the header of the packet greater than MTU, received via the CSIX fabric 22.

If the fragmentation flag is set in the header of the packet to be greater than MTU as a result of the flag setting determination in step S210, the Ethernet ARP micro-engine 211 of the egress network processor 21 sends the packet greater than the MTU to the egress fragmentation micro-engine 215 of the egress network processor 21 without sending the packet to the packet scheduler micro-engine 212 in step S220.

In step S230, the egress fragmentation micro-engine 215 of the egress network processor 21 fragments the packet greater than the MTU.

Next, in step S240, the egress fragmentation micro-engine 215 of the egress network processor 21 sends the fragmented packet to the packet scheduler micro-engine 212 of the egress network processor 21.

Below, with reference to FIG. 8, an operation of the egress network processor will be described.

The egress network processor 21 includes at least one micro-engine, which is constructed with eight (8) threads to operate and is realized using assembly language.

First, in step S241, the egress control thread of the egress fragmentation micro-engine 215 determines whether an idle thread is present.

If the idle thread is present as a result of the idle thread determination in step S241, the egress control thread of the egress fragmentation micro-engine 215 determines whether the fragmentation rate of the thread, which has been running, exceeds a predetermined threshold in step S242.

If the fragmentation rate of thread, which has been running, does not exceed the predetermined threshold as a result of the fragmentation rate determination in step S242, the egress control thread of the egress fragmentation micro-engine 215 allocates fragmentation to the idle thread in step S243.

In the idle thread determination in step S241, if the idle thread is not present, the egress control thread of the egress fragmentation micro-engine 215 sends the packet greater than the MTU to the packet scheduler micro-engine 212 without fragmenting the packet in step S244.

In the fragmentation rate determination S242, if the fragmentation rate of thread, which has been running, exceeds the predetermined threshold, the egress control thread of the egress fragmentation micro-engine 215 sends the packet greater than the MTU to the packet scheduler micro-engine 212 without fragmenting the packet in S245.

While the present invention has been described with reference to certain preferred embodiments thereof, it will be understood by those skilled in the art that various changes in form and details may be made therein without departing from the spirit and scope of the present invention as defined by the appended claims.

What is claimed is:

1. An apparatus for processing Internet Protocol (IP) packet fragmentation in a routing system using a network processor, comprising:
   an ingress network processor receiving a packet, and if a size of the received packet is greater than a Maximum Transmission Unit (MTU and if a fragmentation rate of a thread does not exceed a predetermined threshold), fragmenting the packet rather than sending the packet to a control processor to fragment the packet; and
   an egress network processor fragmenting the packet greater than the MTU rather than sending the packet to a control processor to fragment the packet when the packet is received via a Common Switch Interface (CSIX) switch fabric from the ingress network processor and if the packet is not fragmented in the ingress network processor.

2. The apparatus of claim 1, wherein the ingress or egress network processor includes at least one micro-engine, which includes eight threads to operate and is realized using assembly language.

3. The apparatus of claim 1, wherein the ingress network processor includes:
   a packet forwarder micro-engine determining whether the received packet is greater than the MTU, sending the packet to a CSIX scheduler micro-engine if the packet is not greater than the MTU, and sending the packet to an ingress fragmentation micro-engine if the packet is greater than the MTU;
   the ingress fragmentation micro-engine fragmenting the packet received via the packet forwarder micro-engine if the packet is greater than the MTU; and
   a CSIX transmission micro-engine sending the packet greater than the MTU to the egress network processor by adding to the packet a flag indicating whether the packet is greater than the MTU when the packet is not fragmented in the ingress fragmentation micro-engine.

4. The apparatus of claim 3, wherein the egress fragmentation micro-engine includes:
   a control thread determining whether an idle thread is present when the packet greater than the MTU is received, determining whether a fragmentation rate of the thread, which has been running, exceeds a predetermined threshold if the idle thread is present, and allocating fragmentation of the packet greater than the MTU to the idle thread if the fragmentation rate does not exceed the predetermined threshold; and
   at least one fragmentation thread fragmenting the received packet when the fragmentation is allocated by the control thread, and sending the fragmented packet to the packet scheduler micro-engine while providing fragmentation rate information to the control thread.

5. The apparatus of claim 4, wherein the control thread sends the packet greater than the MTU to the packet scheduler micro-engine without fragmenting the packet if the idle thread is not present.

6. The apparatus of claim 5, wherein the control thread sends the packet greater than the MTU to the packet scheduler micro-engine without fragmenting the packet if the fragmentation rate of the thread, which has been running, exceeds the predetermined threshold.

7. The apparatus of claim 1, wherein the egress network processor includes:
   a CSIX receive micro-engine determining whether the packet received from the ingress network processor via the CSIX switch fabric is greater than the MTU by checking a header of the packet;
   an egress fragmentation micro-engine fragmenting the packet received via the packet forwarder micro-engine and sending the fragmented packet to a packet scheduler micro-engine if the packet is greater than the MTU; and
   an Ethernet Address Resolution Protocol (ARP) micro-engine sending the packet, received via the CSIX receive micro-engine, to the packet scheduler micro-engine if the packet is not greater than the MTU and sending the packet to the egress fragmentation micro-engine if the packet is greater than the MTU.

8. The apparatus of claim 7, wherein the ingress fragmentation micro-engine includes:
   a control thread determining whether an idle thread is present when the packet greater than the MTU is received, determining whether a fragmentation rate of a thread, which has been running, exceeds a predetermined threshold if the idle thread is present, and allocating fragmentation of the packet greater than the MTU to the idle thread if the fragmentation rate exceeds the predetermined threshold; and at least one fragmentation thread fragmenting the received packet when the fragmentation is allocated by the control thread, and sending the fragmented packet to the CSIX scheduler micro-engine while providing fragmentation rate information to the control thread.

9. The apparatus of claim 7, wherein the control thread sends the packet greater than the MTU to the CSIX scheduler micro-engine without fragmenting the packet if the idle thread is not present.

10. The apparatus of claim 9, wherein the control thread sends the packet greater than the MTU to the CSIX scheduler micro-engine without fragmenting the packet if the fragmentation rate of the thread, which has been running, exceeds the predetermined threshold.

11. A method for processing Internet Protocol (IP) packet fragmentation in a routing system using a network processor, comprising:
 determining, at a forwarder micro-engine of an ingress network processor, whether a size of a received packet is greater than a Maximum Transmission Unit (MTU);
 if the size of the packet is greater than the MTU, sending, at the forwarder micro-engine of the ingress network processor, the packet to an ingress fragmentation micro-engine of an ingress network processor; and
 fragmenting, at the ingress fragmentation micro-engine of the ingress network processor, the packet greater than the MTU,
 wherein the packet fragmentation at the ingress fragmentation micro-engine comprises:
 allocating a thread to fragment the packet greater than the MTU;
 fragmenting, at the allocated thread, the packet greater than the MTU;
 sending, at the allocated thread, the packet greater than the MTU to a Common Switch Interface (CSIX) scheduler micro-engine after the packet is fragmented; and
 sending, at the allocated thread, a fragmentation rate to a control thread.

12. The method of claim 11, wherein the packet fragmentation at the ingress fragmentation micro-engine comprises:
 determining, at an ingress control thread of the ingress fragmentation micro-engine, whether an idle thread is present;
 if the idle thread is present, determining, at the ingress control thread of the ingress fragmentation micro-engine, whether a fragmentation rate of threads, which have been running, exceed a predetermined threshold; and
 if the fragmentation rate of the threads, which have been running, do not exceed the predetermined threshold, allocating, at the ingress control thread of the ingress fragmentation micro-engine, fragmentation to the idle thread.

13. The method of claim 12, further comprising:
 if the idle thread is not present as a result of the idle thread determination, sending, at the ingress fragmentation micro-engine, the packet greater than the MTU to the CSIX scheduler micro-engine without fragmenting the packet.

14. The method of claim 13, further comprising:
 when the ingress control thread of the ingress fragmentation micro-engine sends the packet greater than the MTU to the CSIX scheduler micro-engine without fragmenting the packet, sending, at a CSIX transmission micro-engine of the ingress network processor, the packet greater than the MTU to an egress network processor via a CSIX switch fabric by setting a fragmentation flag in a header of the packet.

15. The method of claim 14, further comprising:
 when the packet greater than the MTU is received via the CSIX switch from the ingress network processor, fragmenting, at the egress network processor, the packet greater than the MTU without sending the packet to a control processor to fragment the packet.

16. The method of claim 15, wherein the packet fragmentation at the egress network processor comprises:
 determining, at a CSIX receive micro-engine of the egress network processor, whether a fragmentation flag is set in the header of the packet greater than the MTU, received via the CSIX switch fabric;
 if the fragmentation flag is set in the header of the packet greater than the MTU as a result of the flag setting determination, sending, at an Ethernet Address Resolution Protocol (ARP) micro-engine, the packet greater than the MTU to an egress fragmentation micro-engine rather than to a packet scheduler micro-engine of the egress network processor;
 fragmenting, at the egress fragmentation micro-engine of the egress network processor, the packet greater than the MTU; and
 sending, at the egress fragmentation micro-engine of the egress network processor, the fragmented packet to the packet scheduler micro-engine of the egress network processor.

17. The method of claim 16, wherein the network processor includes at least one micro-engine, which includes eight threads to operate and is realized using assembly language.

18. The method of claim 17, wherein the packet fragmentation at the egress network processor comprises:
 determining, at the egress control thread of the egress fragmentation micro-engine, whether an idle thread is present;
 if the idle thread is present, determining, at the egress control thread of the egress fragmentation micro-engine, whether a fragmentation rate of threads, which have been running, exceed the predetermined threshold; and
 if the fragmentation rate of the threads, which have been running, do not exceed the predetermined threshold, allocating, at the egress control thread of the egress fragmentation micro-engine, fragmentation to the idle thread.

19. The method of claim 18, further comprising:
 if the idle thread is not present as a result of the idle thread determination, sending, at the egress control thread of the egress fragmentation micro-engine, the packet greater than the MTU to the packet scheduler micro-engine without fragmenting the packet.

20. The method of claim 19, further comprising:
 if the fragmentation rate of the threads, which have been running, exceed the predetermined threshold as a result the fragmentation rate determination, sending, at the egress control thread of the egress fragmentation micro-engine, the packet greater than the MTU to the packet scheduler micro-engine without fragmenting the packet.

21. The method of claim 12, further comprising:
 if the fragmentation rate of the threads, which have been running, exceed a predetermined threshold as a result of the fragmentation rate determination, sending, at the ingress control thread of the ingress fragmentation micro-engine, the packet greater than the MTU to the CSIX scheduler micro-engine without fragmenting the packet.

22. The method of claim 21, further comprising:

when the ingress control thread of the ingress fragmentation micro-engine sends the packet greater than the MTU to the CSIX scheduler micro-engine without fragmenting the packet, sending, at a CSIX transmission micro-engine of the ingress network processor, the packet greater than the MTU to an egress network processor via a CSIX switch fabric by setting a fragmentation flag in a header of the packet.

* * * * *